US 8,127,638 B2

(12) United States Patent
Kumagai et al.

(10) Patent No.: US 8,127,638 B2
(45) Date of Patent: Mar. 6, 2012

(54) SHIFT LEVER APPARATUS

(75) Inventors: Tadashi Kumagai, Nishio (JP); Takamitsu Itoh, Nishio (JP)

(73) Assignee: Aisin Ai Co., Ltd., Nishio-Shi, Aichi-Ken (JP)

( * ) Notice: Subject to any disclaimer, the term of this patent is extended or adjusted under 35 U.S.C. 154(b) by 890 days.

(21) Appl. No.: 11/941,520

(22) Filed: Nov. 16, 2007

(65) Prior Publication Data

US 2008/0115612 A1    May 22, 2008

(30) Foreign Application Priority Data

Nov. 17, 2006  (JP) ................... 2006-311765

(51) Int. Cl.
*B60K 20/00* (2006.01)
*F16H 59/04* (2006.01)

(52) U.S. Cl. .................... 74/473.35; 74/473.3

(58) Field of Classification Search .............. 74/473.1, 74/473.3, 473.34, 473.35; 267/289, 150
See application file for complete search history.

(56) References Cited

U.S. PATENT DOCUMENTS

| | | | |
|---|---|---|---|
| 3,008,342 A | 11/1961 | Brunot | |
| 3,572,678 A * | 3/1971 | Jerz, Jr. | 267/225 |
| 4,333,360 A * | 6/1982 | Simmons | 74/473.34 |
| 4,569,245 A | 2/1986 | Feldt et al. | |
| 4,581,951 A | 4/1986 | Watson | |
| 5,263,695 A * | 11/1993 | Bianchi | 267/225 |
| 5,272,931 A * | 12/1993 | Daniel | 74/473.1 |
| 5,476,021 A * | 12/1995 | Burger | 74/473.1 |
| 2006/0049560 A1 * | 3/2006 | Chun et al. | 267/169 |
| 2008/0098846 A1 * | 5/2008 | Kitten et al. | 74/473.35 |

FOREIGN PATENT DOCUMENTS

| | | |
|---|---|---|
| DE | 28 55 024 A1 | 6/1980 |
| DE | 199 60 194 A1 | 6/2001 |
| EP | 0 149 019 A2 | 7/1985 |
| EP | 0 149 019 A3 | 7/1985 |
| FR | 2 710 588 A | 4/1995 |
| GB | 2 098 288 A | 11/1982 |
| JP | 7-305769 A | 11/1995 |
| JP | 2000-16108 A | 1/2000 |

OTHER PUBLICATIONS

Extended European Search issued in corres. EP 07 02 2272, Aug. 26, 2008, EPO, Munich, DE.
Partial European Search Report issued in corresponding EP 07 02 2272, Mar. 12, 2008, EPO, Munich, DE.
Japanese Office Action issued Mar. 8, 2011 by the Japanese Patent Office in Japanese Patent Application No. 2006-311765 and English language translation of Office Action.

* cited by examiner

*Primary Examiner* — Justin Krause
(74) *Attorney, Agent, or Firm* — Buchanan Ingersoll & Rooney PC

(57) ABSTRACT

A shift lever apparatus includes a shift lever including a pivot portion and a stick portion formed so as to extend in a vertical direction from the pivot portion, a base member including a shift lever supporting portion and a shift direction and a positioning member for applying a biasing force to the shift lever, and the positioning member having a first elastic member for pressing the shift lever, a second elastic member whose spring constant is smaller than that of the first elastic member and a second elastic member compressed amount regulating member for regulating the second elastic member to be compressed by a predetermined compressed amount so that a length of the second elastic member is a predetermined length.

10 Claims, 6 Drawing Sheets

SHIFT LEVER APPARATUS

CROSS REFERENCE TO RELATED APPLICATIONS

This application is based on and claims priority under 35 U.S.C. §119 to Japanese Patent Application 2006-311765, filed on Nov. 17, 2006, the entire content of which is incorporated herein by reference.

FIELD OF THE INVENTION

The present invention relates to a shift lever apparatus for operating a manual transmission applied to a vehicle, especially to an automobile.

BACKGROUND

A manual transmission relating to a known art is operated in a manner where a gear engagement is switched by means of a shift operation and a select operation executed by a driver in order to achieve an appropriate shift stage. A shift lever apparatus related to the known art illustrated in FIG. 6 includes a shift lever 2 comprised of a stick portion 22 arranged so as to extend in an approximate vertical direction, arm portions 211 each formed so as to extend in a direction that is perpendicular to the stick portion 22, and a pivot portion 21 formed at a point where the stick portion 22 crosses the arm portion 211. In this configuration, the shift lever 2 is operated by the driver so as to pivot relative to the pivot portion 21.

Specifically, the shift lever 2 is normally located at a neutral position at which an axial direction of the stick portion 22 is maintained in a vertical direction, and the select operation of the shift lever 2 is executed from the neutral position thereof. Further, the shift lever 2 normally has a select return function by which the shift lever 2 can be returned to the neutral position from any positions after the select operation.

In addition to the select return function, the shift lever apparatus illustrated in FIG. 6 further includes two positioning members each having a spring by which the shift lever 2 is maintained at the neutral position. Specifically, each positioning member is positioned so as to engage each arm portion, and the spring of each positioning member applies a biasing force to the arm portion so as to move upward.

In this configuration, however, the shift lever apparatus may vibrate due to vibrations generated at the manual transmission or at an engine, and the shift lever 2 may vibrate accordingly. Because the shift lever 2 vibrates, the shift lever 2 may not be set to the neutral position appropriately, or the vibration may be transmitted to the driver, so that a level of shift feeling may be decreased.

The shift lever 2 may not vibrate by arranging the positioning members so as not to engage the arm portion 211 or by setting a spring constant of the spring provided at each positioning member so that the vibrations of the transmission or the engine may not be transmitted to the shift lever 2.

In either way, however, the neutral position of the shift lever 2 is still not set stably.

A need thus exists for a shift lever apparatus which is not susceptible to the drawback mentioned above.

SUMMARY OF THE INVENTION

According to an aspect of the present invention, a shift lever apparatus includes a shift lever having a pivot portion and a stick portion formed so as to extend in a vertical direction from the pivot portion, a base member having a shift lever supporting portion for supporting the pivot portion so that the shift lever is pivotable in a select direction and a shift direction and a positioning member for applying a biasing force to the shift lever so as to pivot in one direction and the other direction of the select direction so that the shift lever is balanced at a neutral position of the select direction, and the positioning member including a first elastic member for pressing the shift lever in a manner where one portion thereof contacts the shift lever and for compressing/extending in accordance with the pivotal, movement of the shift lever in the select direction, a second elastic member whose spring constant is smaller than that of the first elastic member and provided so as to be in line with the first elastic member, and a second elastic member compressed amount regulating member for regulating the second elastic member to be compressed by a predetermined compressed amount so that a length of the second elastic member is a predetermined length.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
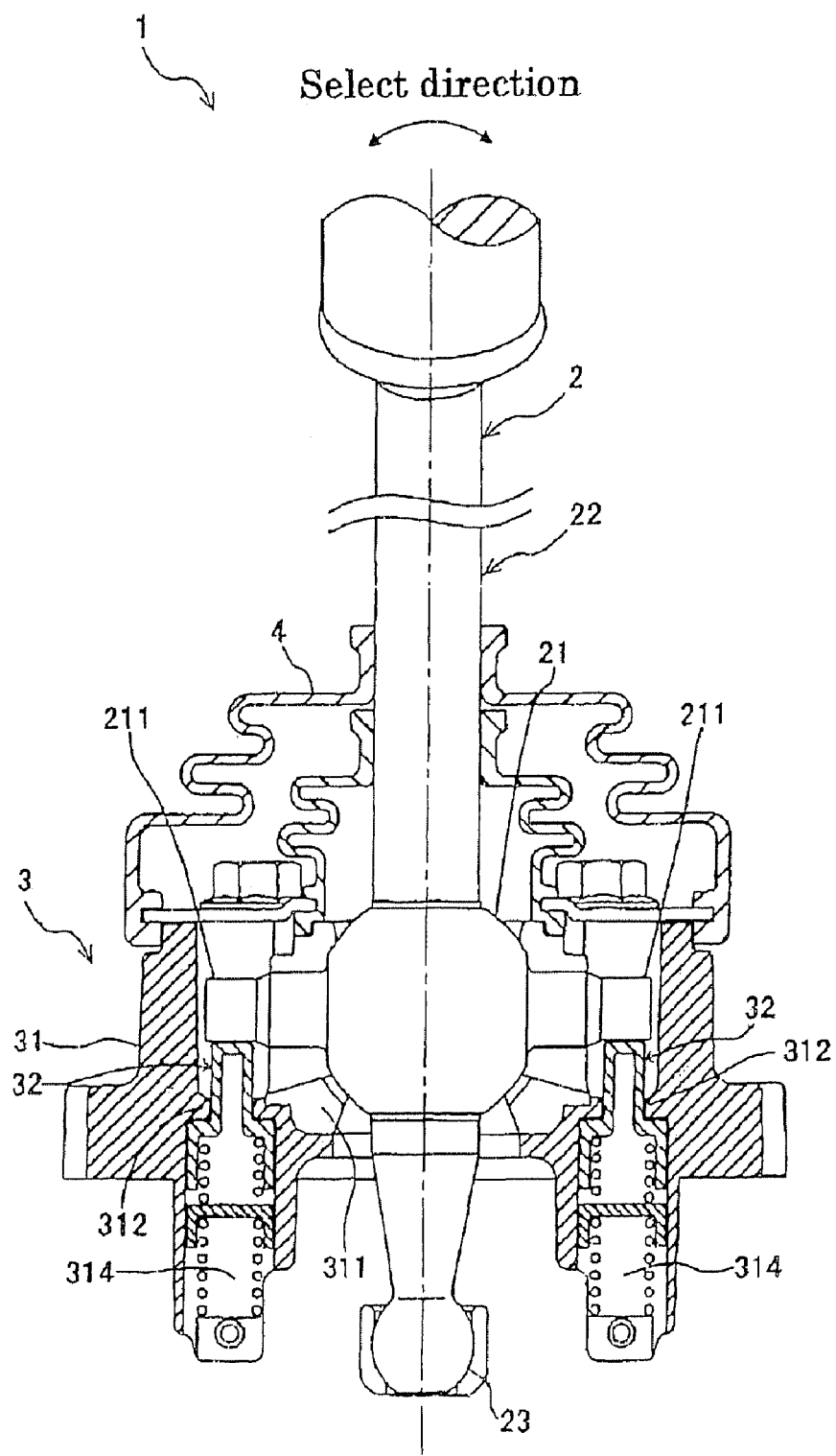
FIG. 1 illustrates a partial cross section of a shift lever apparatus in the first embodiment.

A shift lever apparatus related to the present invention includes a shift lever and a base member, and the shift lever includes a pivot portion and a stick portion. The shift lever is pivotable in a shift direction and a select direction relative to the pivot portion, and a shift stage of a transmission can be achieved by operating the shift lever apparatus by pivoting the shift lever. Specifically, the shift lever is pivoted by moving the stick portion thereof. A neutral position of the shift lever in the select direction thereof may be selectively set at a position where, for example, an axial direction of the shift lever extends in a vertical direction.

The base member includes shift lever supporting portions and positioning members, and the shift lever supporting portions support a pivot portion of the shift lever so as to be pivotable in a select direction and a shift direction.

Specifically, each positioning member includes a first elastic member, a second elastic member and a second elastic member compressing amount regulating member. The first elastic member is arranged so as to be in line with the second elastic member and both apply biasing force to the shift lever so that the shift lever is located at the neutral position. The first elastic member has a spring constant that is larger than a spring constant of the second elastic member.

The second elastic member compressing amount regulating member regulates the second elastic member to be compressed by a predetermined compressing amount or less so as to be a predetermined length or longer. For example, the second elastic member compressing amount regulating member includes a spacer and a compression regulating member, and the spacer is formed, for example, in a short cylinder shape and positioned between the first elastic member and the second elastic member. The compression regulating member is arranged so as to be parallel with the second elastic member at a certain part of the compression regulating member whose length is identical to a length of the second elastic member that is compressed by a predetermined compressing amount so as to be the predetermined length, so that the second elastic member is not further compressed.

Specifically, the compression regulating member further includes a first regulating portion to which one end of the second elastic member is fixed and a second regulating portion engaging the spacer at the other end of the second regulating portion when the second elastic member is compressed by the predetermined compressing amount so as to be the predetermined length.

The compression regulating member prevents the second elastic member being further compressed in a manner where the second regulating portion engages the spacer when the second elastic member is compressed by the predetermined compressing amount so as to be the predetermined length.

The second elastic member compressing amount regulating member may further include a spacer maintaining portion. The spacer maintaining portion regulates a movement of the spacer so as not to further compress the second elastic member. Specifically, the spacer maintaining portion regulates the spacer so as not to further move toward the second elastic member so that the second elastic member is not compressed so as to be less than a length obtained by adding a length of the second regulating portion to a length of the predetermined compressing amount, when the shift lever is set to the neutral position.

The base member further includes a maintaining portion. A total length of the first elastic member and the second elastic member when the shift lever is located at the neutral position is set to be a predetermined total length, and the base member includes a maintaining portion for maintaining a length obtained by adding a length of the first elastic member and a length of the second elastic member is equal to or less than the predetermined total length.

Thus, the maintaining portion prevents the shift lever being biased by the positioning member so as not to be the neutral position. Especially, by compressing the first elastic member and the second elastic member in advance, counteraction against the operation of the shift lever moved from the neutral position is rapidly generated, as a result, the driver may obtain a smooth operational feeling.

The present invention will be explained in more detail with reference to embodiments.

First Embodiment

Figure 2:
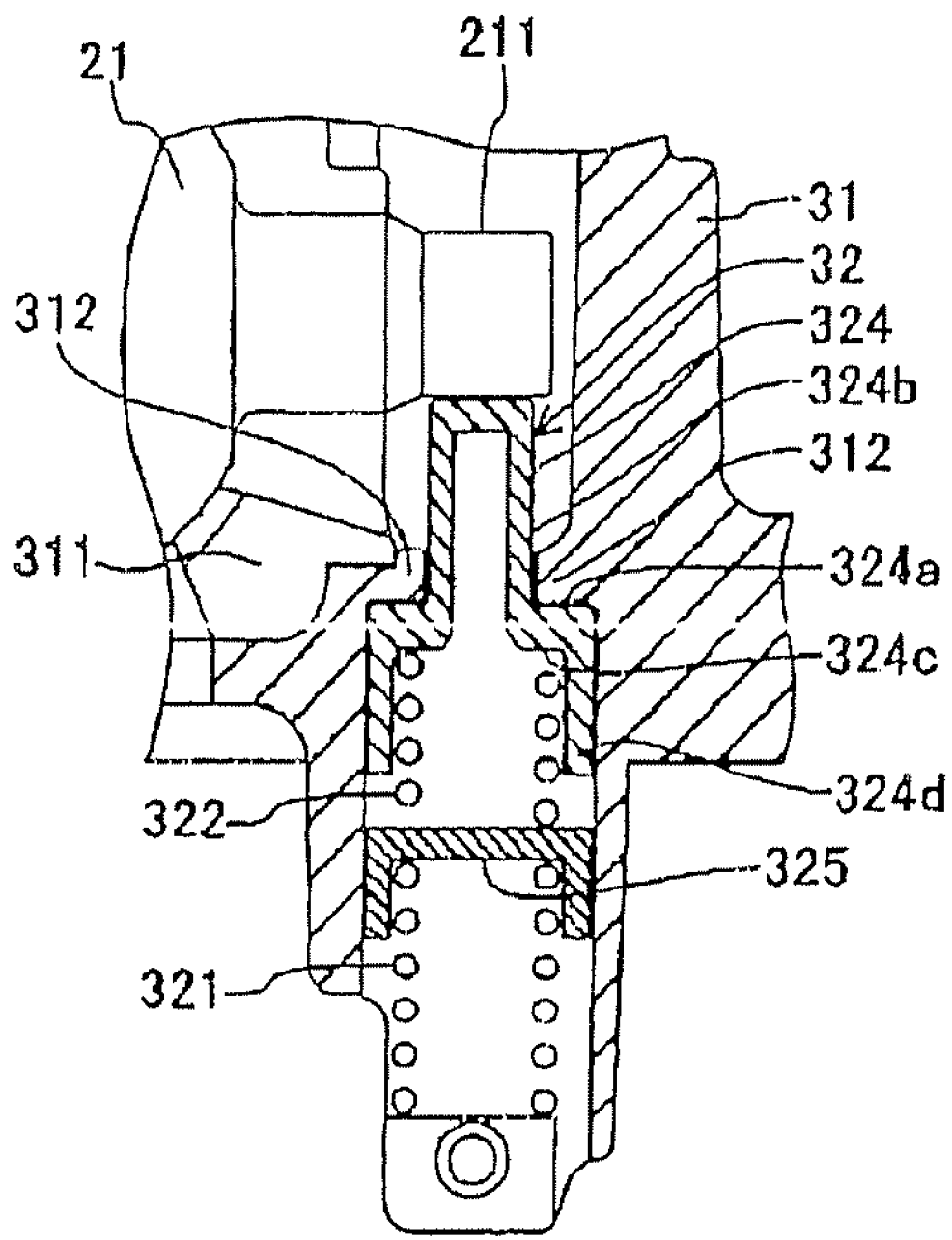
FIG. 2 illustrates an enlarged cross section of the shift lever apparatus in FIG. 1.

FIG. 1 illustrates a diagram of a shift lever apparatus 1 in a first embodiment. The diagram illustrates a partial cross section of the shift lever apparatus. FIG. 2 illustrates a partial enlarged cross section of a part of the shift lever apparatus 1.

The shift lever apparatus 1 includes a shift lever 2, a base member 3 and a cover 4. The base member 3 supports the shift lever 2 so as to be pivotable in a select direction and a shift direction, and the cover 4 is positioned so as to cover the base member 3.

The shift lever 2 includes a pivot portion 21, a stick portion 22 and a connecting portion 23. The stick portion 22 is provided so as to extend in an approximate vertical direction from the pivot portion 21 at one side thereof, and the connecting portion 23 is also provided at the pivot portion 21 at the opposite side where the stick portion 22 is provided. The connecting portion 23 is connected to the transmission (not shown) through an any (not shown). The pivot portion 21 further includes the arm portions 211, each of which protrudes from the pivot portion 21 in a direction that is perpendicular to an axial direction of the stick portion 22. Specifically, one of the arm portions 211 is formed at one side (e.g., the left side) of the pivot portion 21 so as to extend in a direction that is identical to the other of the an portions 211 formed at the other side (e.g., the right side) of the pivot portion 21. Thus, the axial line of the stick portion 22 crosses the axial line of the arm portions 211 at the pivot portion 21.

The base member 3 includes a housing 31 and positioning members 32. Specifically, shift lever supporting portions 311 are integrally formed on the base member 3, and each of the positioning members 32 applies biasing force to the shift lever 2 in one direction or the other direction of the select direction so that the shift lever 2 is balanced in a horizontal direction and maintained at the neutral position. The housing 31 includes positioning member mounting positions 314 each formed in an approximate cylinder shape, and each positioning member 32 is provided within the positioning member mounting portion 314. The housing 31 further includes maintaining portions 312. Each of the maintaining portion 312 is provided at an upper portion of the positioning member mounting portion 314 so that the maintaining portion 312 maintains the positioning member 32 to apply biasing force to the shift lever 2, accordingly the shift lever 2 is set to the neutral position. As shown in FIG. 2, the positioning member 32 includes a first elastic member 321, a second elastic member 322, a cap 324 (compression regulating member) and a spacer 325. The first elastic member 321 is arranged so as to be in line with the second elastic member 322, and each of the first elastic member 321 and the second elastic member 322 is compressed in an axial direction of the shift lever 2. The second elastic member 322 has a spring constant that is smaller than a spring constant of the first elastic member 321. As the elastic member, the first elastic member 321 is provided at a lower portion of the shift lever apparatus, and the second elastic member 322 is provided above the first elastic member 321. The cap 324 is formed so as to open downward and to have shoulder portions 324a and a top portion 324b. Specifically, each shoulder portion 324a contacts the maintaining portion 312 at an upper surface of the shoulder portion 324b in an axial direction thereof, and the top portion 324b is formed so as to protrude upward in an axial direction thereof from the shoulder portions 324a and to include an opening at a lower portion thereof. In this configuration, the top portion 324b contacts a lower surface of the arm portion 211. The cap 324 is provided so as to cover one end portion of the second elastic member 322, and the one end of the second elastic member 322 is fixed to a first regulating portion 324c of the cap 324. A length of a second regulating portion 324d in an axial direction thereof from the first regulating portion 324c to a point at which the second regulating portion 324d contacts the spacer 325 is set to be identical to or longer than the predetermined length of the second elastic member 322 when the second regulating portion 324d contacts the spacer 325. Further, the spacer 325 is formed in a short cylinder shape having an opening at lower end in an axial direction thereof and arranged so as to cover the first elastic member 321 and to be sandwiched between an lower end of the second elastic member 322 and an upper end of the first elastic member 321. In this configuration, when the shift lever 2 is located at the neutral position, a predetermined buffering space is provided between the cap 324 and the spacer 325, so that the cap 324 does not contact the spacer 325.

In this configuration, the shift lever 2 of the shift lever apparatus 1 in the first embodiment 1 is set to the neutral position relative to the pivot portion 21 in a manner where each of the arm portions 211 thereof is positioned at an identical height, in other words a direction of the axis of each arm portion 211 is horizontal. Further, the shift lever 2 is pivoted in the select direction in a manner where one of the arm portions 211 is moved upward and the other of the arm portions 211 is moved downward. In FIG. 1, the shift lever 2 is pivoted in the select direction by moving the shift lever 2 in a right-left direction. The shift lever 2 is pivoted in the shift direction in a manner where the shift lever 2 is pivoted relative to a horizontal axis of the arm portion 211. In FIG. 1, the shift lever 2 is pivoted in the shift direction by moving the shift lever 2 in a front-rear direction in the drawing that is perpendicular to the drawing, specifically by moving the shift lever 2 toward the front or the rear of the vehicle.

The housing 31 of the shift lever apparatus 1 according to the first embodiment supports the pivot portion 21 at the shift lever supporting portions 211 so that the shift lever 2 can be pivoted in the shift direction and the select direction relative to the pivot portion 21. The shift lever 2 is maintained at the neutral position in the select direction in a manner where each arm portion 211 is pressed by the positioning member 32 upward in an axial direction of each of the first elastic member 321 and the second elastic member 322. In this configuration, when the shift lever 2 is located at the neutral position, the top portion 324b of the cap 324 of each positioning member 32 engages the lower portion of each arm portion 211, and the shoulder portions 324a of the positioning member 32 engages the maintaining portion 312. In this configuration, the buffering space having a predetermined distance is provided between the cap 324 and the spacer 325.

Figure 3:
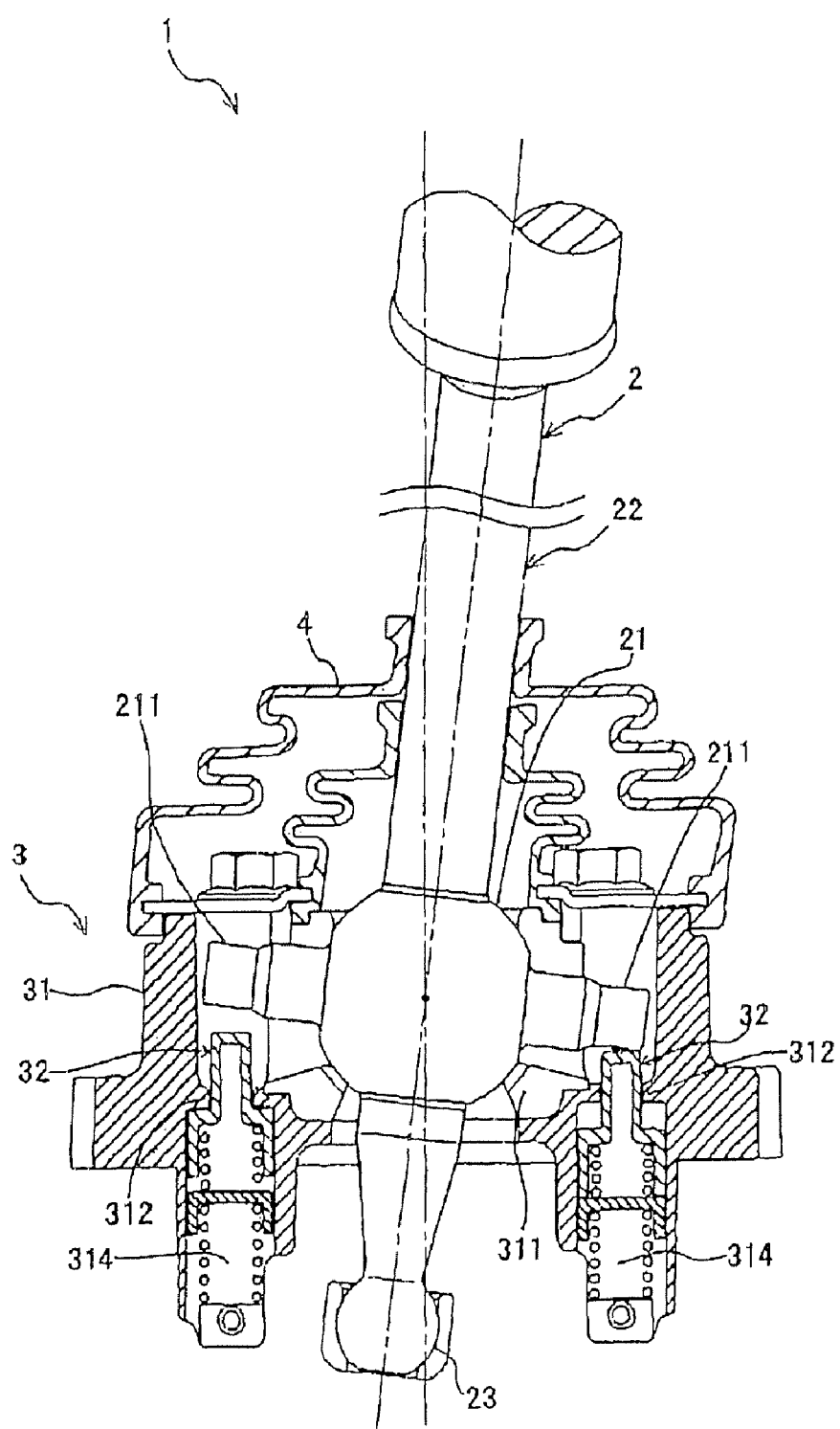
FIG. 3 illustrates a partial cross section in which the shift lever is pivoted in a select direction.

When the shift lever 2 of the shift lever apparatus 1 according to the first embodiment is pivoted toward one side of the select direction, one of the arm portions 211 is moved downward, and the other of the arm portions 211 is moved upward. For example, in FIG. 3, when the shift lever 2 is moved toward the right, the right arm portion 211 is moved downward, and the left arm portion is moved upward. At this point, the elastic member of the right positioning member 32 is compressed, and the left positioning member 32 disengages the arm portion 211. The first elastic member 321 and the second elastic member 322 of the right positioning member 32 are compressed, and the cap 324 and the spacer 325 are moved downward in axial directions thereof. The left positioning member 32 is regulated so as not to move upward any further in a manner where the shoulder portions 324a of the cap 324 of the left positioning member 32 engage the maintaining portion 312 at the upper surface of the shoulder portions 324a. After the shift lever 2 is pivoted in the select direction, because the elastic member of the right positioning member 32 being compressed as mentioned above is extended, the right arm portion 211 of the shift lever 2 is pressed upward by the right positioning member 32, so that the shift lever 2 is rotated relative to the pivot portion 21 in a manner where the right arm portion 211 is moved upward and the left arm portion 311 is moved downward. Then, the top portion 324b of the cap 324 being disengaged from the left arm portion 211 engages the lower portion of the left arm portion 211, as a result, the shift lever 2 is returned to the neutral position.

In this configuration, when the vibrations are transmitted from the manual transmission and the like to the shift lever apparatus 1, although the first elastic members 321 of the positioning members 23 vibrate, and the second elastic members 322 absorb the vibrations of the first elastic members 321. At this point the spacers 325 also vibrate due to the vibrations of the first elastic members 321, however, when the shift lever 2 is located at the neutral position, because of the buffering space provided between the cap 324 and the spacer 325 of the each positioning member 23, even when the spacer 325 vibrates, because the spacer 325 does not contact the cap 324, the vibrations are not transmitted to the cap 324. In this configuration, because the second elastic member does not vibrate, and the vibrations of the spacer 325 are not transmitted to the cap 32, the vibrations from the manual transmission and the like are not transmitted to the shift lever 2, as a result, the shift lever 2 may not vibrate together with the manual transmission and the like.

According to the shift lever apparatus 1 of the first embodiment, the shift lever 2 is set to the neutral position in a manner where the shift lever 2 is maintained at the neutral position in a select direction by means of the first elastic member 321, whose spring constant is relatively large, the cap 324, the spacer 325 and the maintaining portion 312. Further, because the second elastic member 322 whose spring constant is relatively small and the buffering space absorbs the vibrations transmitted from the manual transmission and the like, the shift lever 2 may not vibrate together with the manual transmission and the like.

Second Embodiment

Figure 4:
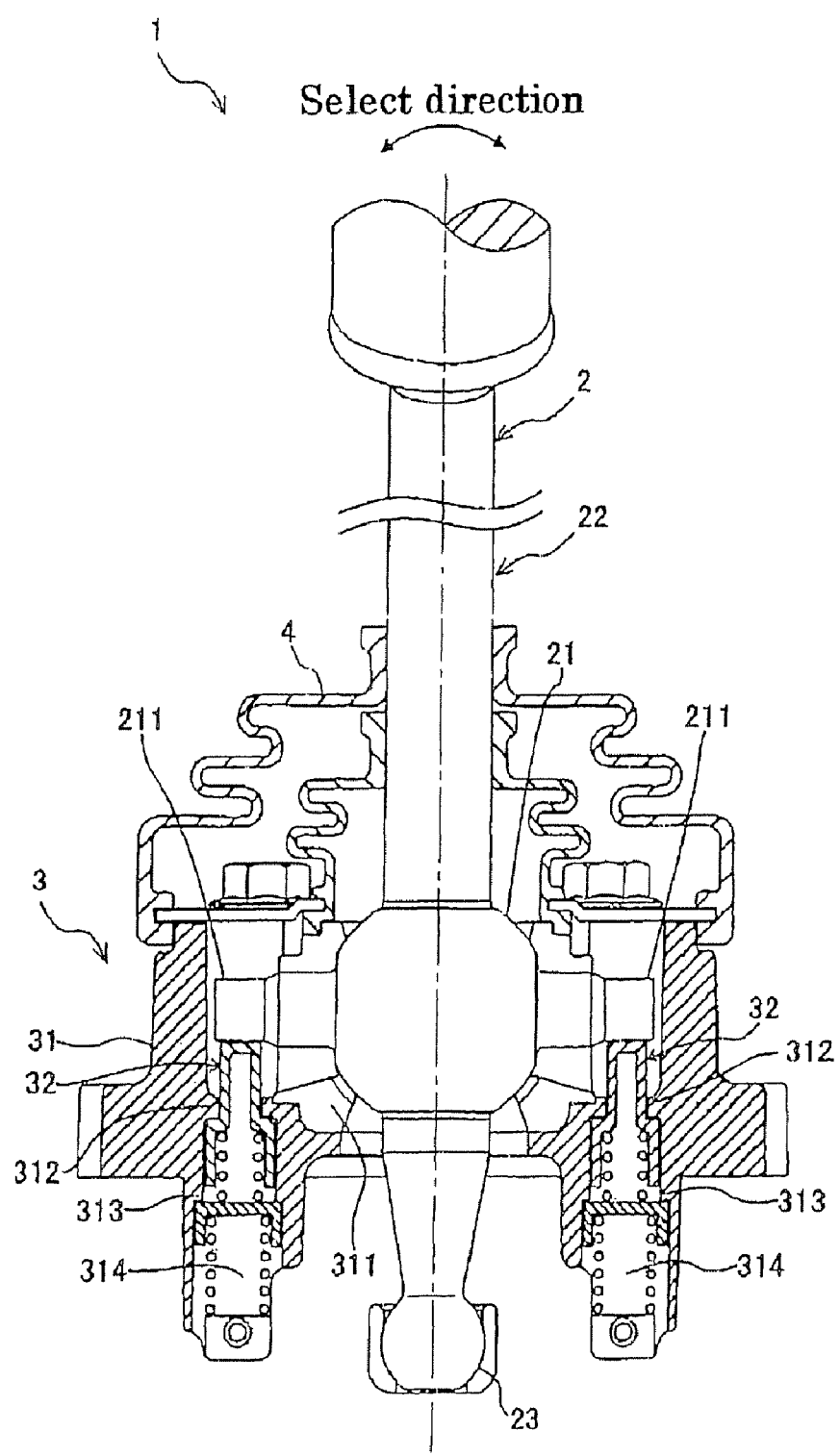
FIG. 4 illustrates a partial cross section of a shift lever apparatus in the second embodiment.
Figure 5:
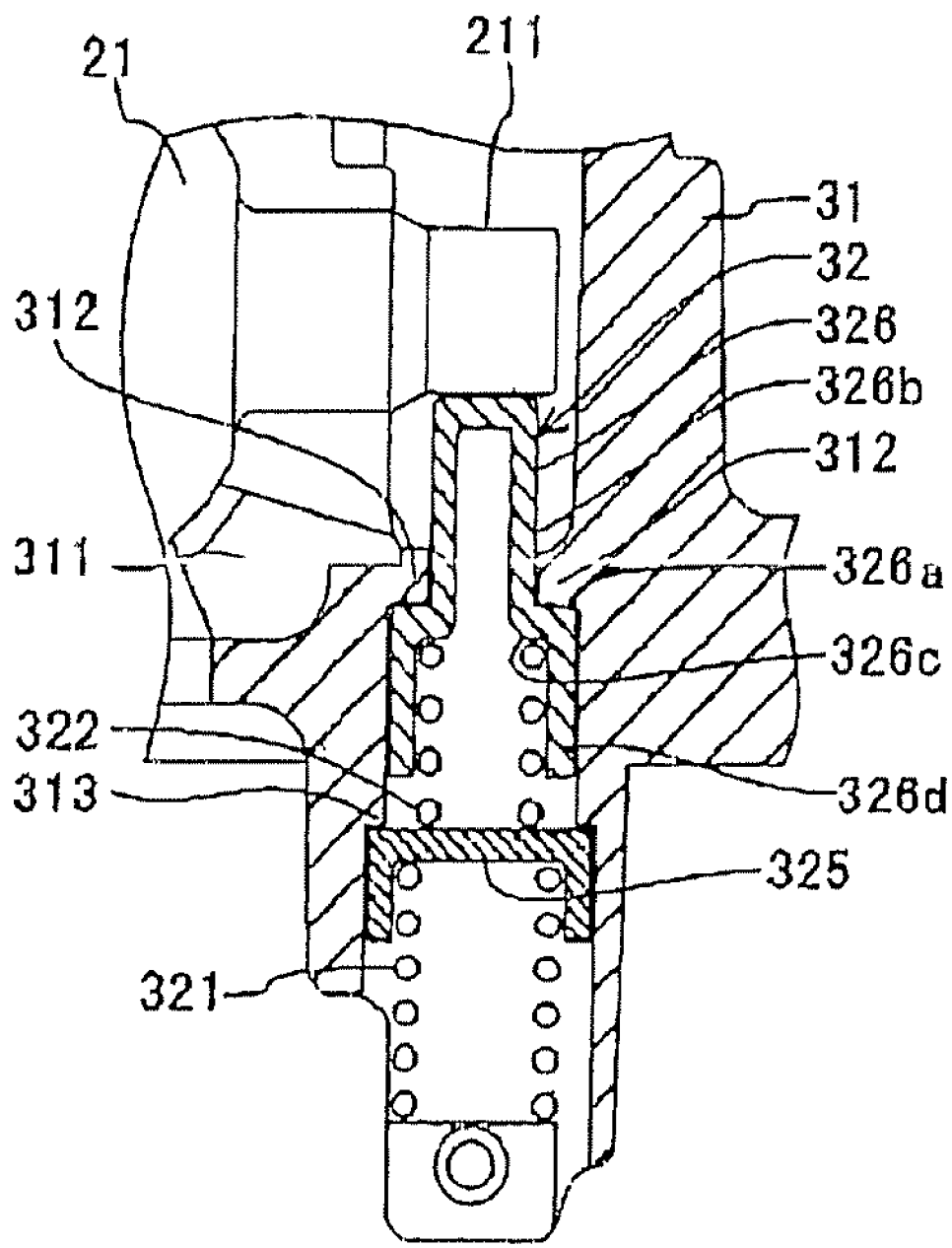
FIG. 5 illustrates in enlarged cross section of the shift lever apparatus in FIG. 4; cud
Figure 6:
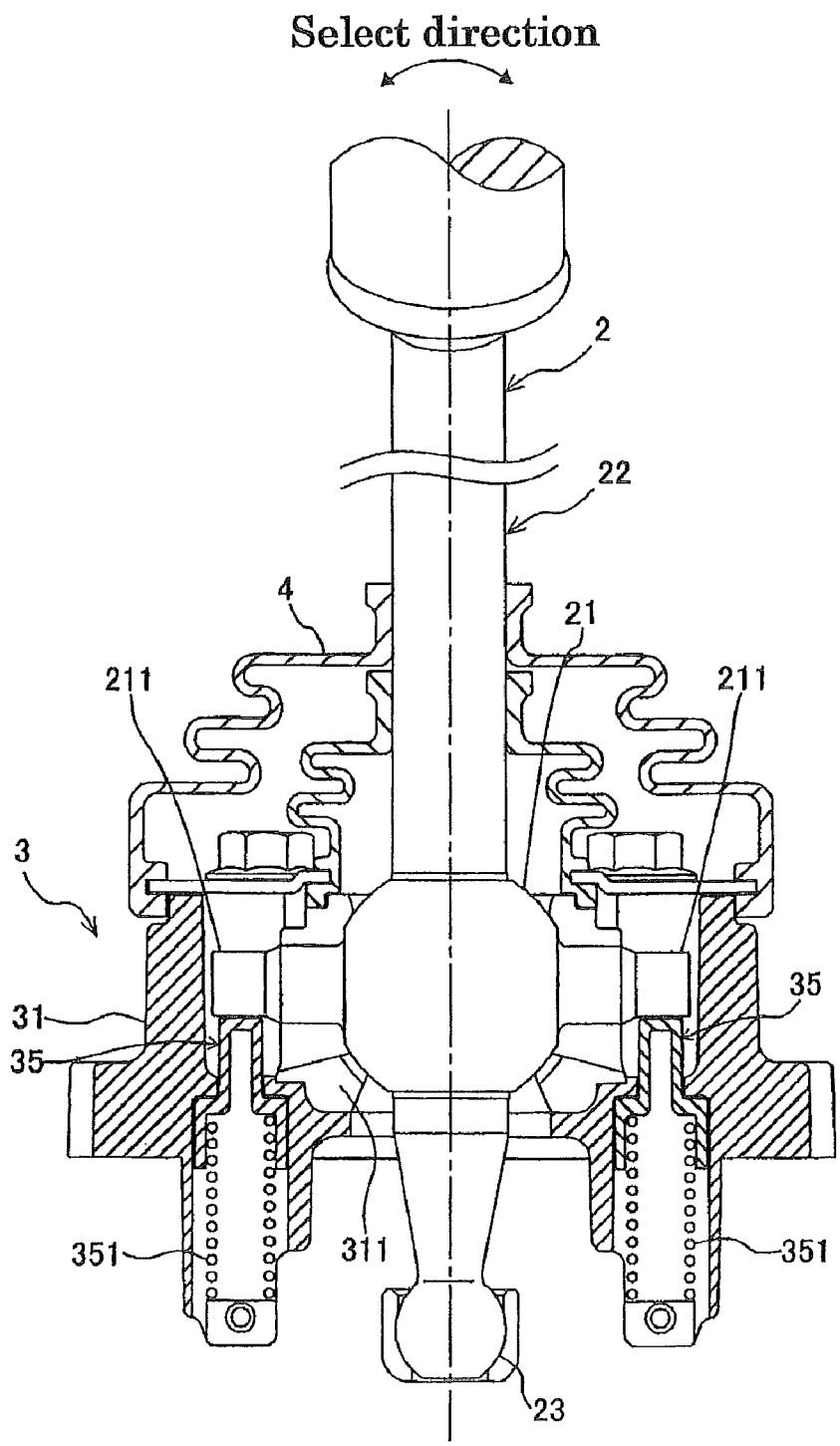
FIG. 6 illustrates a partial cross section of a shift lever apparatus related to the prior art.

A second embodiment of the present invention related to the shift lever apparatus 1 will be explained below. FIG. 4 illustrates a partial cross section of the shift lever apparatus in the second embodiment, and FIG. 5 illustrates an enlarged cross section of the shift lever apparatus 1 in the second embodiment.

The shift lever apparatus 1 in the second embodiment is basically identical to the shift lever apparatus 1 in the first embodiment, and only the shape of the housing 31 in the second embodiment differs from that in the first embodiment. Explanations of the identical portions are omitted here.

According to the second embodiment, the housing 31 of the shift lever apparatus 1 includes shift lever supporting portions 311 for supporting the base portion 21 and positioning members 32. Specifically, each of the positioning members 32 applies biasing force to the shift lever 2 in one direction or the other direction of the select direction so that the shift lever 2 is balanced in a horizontal direction and maintained at the neutral position. The housing 31 includes positioning member mounting positions 314 each formed in an approximate cylinder shape, and each positioning member 32 is provided within the positioning member mounting portion 314. The housing 31 further includes maintaining portions 312 and second maintaining portions 313 (e.g., spacer maintaining portion). Each of the maintaining portion 312 is provided at an upper portion of the positioning member mounting portion 314 so that the maintaining portion 312 maintains the positioning member 32 to apply biasing force to the shift lever 2, accordingly the shift lever 2 is set to the neutral position. As shown in FIG. 5, the positioning member 32 includes a first elastic member 321, a second elastic member 322, a cap 326 (compression regulating member) and a spacer 325. The first elastic member 321 is arranged so as to be in line with the second elastic member 322, and each of the first elastic member 321 and the second elastic member 322 is compressed in an axial direction of the shift lever 2. The second elastic member 322 has a spring constant that is smaller than a spring constant of the first elastic member 321. As the elastic member, the first elastic member 321 is provided at a lower portion of the shift lever apparatus, and the second elastic member 322 is provided above the first elastic member 321. The cap 326 is formed so as to open downward and to have shoulder portions 326a and a top portion 326b. Specifically, each shoulder portion 326a contacts the maintaining portion 312 at an upper surface of the shoulder portion 326b in an axial direction thereof, and the top portion 326b is formed so as to protrude upward in an axial direction thereof from the shoulder portions 326a and to include an opening at a lower portion thereof. In this configuration, the top portion 326b contacts a lower surface of the arm portion 211. The cap 326 is provided so as to cover one end portion of the second elastic member 322, and the one end of the second elastic member 322 is fixed to a first regulating portion 326c of the cap 326. A length of a second regulating portion 326d in an axial direction thereof from the first regulating portion 326c to a point at which the second regulating portion 326d contacts the spacer 325 is set to be identical to or longer than the predetermined length of the second elastic member 322 when the second regulating portion 326d contacts the spacer 325. Further, the spacer 325 is formed in a short cylinder shape having an opening at lower end in an axial direction thereof and arranged so as to cover the first elastic member 321 and to be sandwiched between an lower end of the second elastic member 322 and an upper end of the first elastic member 321. In this configuration, when the shift lever 2 is located at the neutral position, the spacer 325 contacts at un upper portion thereof a lower portion of the second maintaining portion 313, and a predetermined buffering space is provided between the cap 326 and the spacer 325, so that the cap 326 does not contact the spacer 325. A external diameter of the cap 326 is smaller than that of the spacer 325, and the second maintaining portion 313 regulates the spacer 325 so as not to further move upward and not regulate to move downward.

In this configuration, the shift lever 2 of the shift lever apparatus 1 in the second embodiment 2 is set to the neutral position relative to the pivot portion 21 in a manner where each of the arm portions 211 thereof is positioned at an identical height, in other words a direction of the axis of each arm portion 211 is horizontal. Further, the shift lever 2 is pivoted in the select direction in a manner where one of the arm portions 211 is moved upward and the other of the arm portions 211 is moved downward. In FIG. 4, the shift lever 2 is pivoted in the select direction by moving the shift lever 2 in a right-left directions. The shift lever 2 is pivoted in the shift direction in a manner where the shift lever 2 is pivoted relative to a horizontal axis of the arm portion 211. In FIG. 4, the shift lever 2 is pivoted in the shift direction by moving the shift lever 2 in a front-rear direction in the drawing that is perpendicular to the drawing, specifically by moving the shift lever 2 toward the front or the rear of the vehicle.

The housing 31 of the shift lever apparatus 1 according to the second embodiment supports the pivot portion 21 at the shift lever supporting portions 211 so that the shift lever 2 can be pivoted in the shift direction and the select direction relative to the pivot portion 21. The shift lever 2 is maintained at the neutral position in the select direction in a manner where each arm portion 211 is pressed by the positioning member 32 upward in an axial direction of each of the first elastic member 321 and the second elastic member 322. In this configuration, when the shift lever 2 is located at the neutral position, the top portion 326b of the cap 326 of each positioning member 32 engages the lower portion of each arm portion 211, and the shoulder portions 326a of the positioning member 32 engages the maintaining portion 312. In this configuration, the buffering space having a predetermined distance is provided between the bottom portion of the cap 326 and the second maintaining portion 313, and the upper portion of the spacer 3325 contacts the lower portion of the second maintaining portion 313.

When the shift lever 2 of the shift lever apparatus 1 according to the second embodiment is pivoted toward one side of the select direction, one of the arm portions 211 is moved downward, and the other of the arm portions 211 is moved upward. For example, when the shift lever 2 is moved toward the right, the right arm portion 211 is moved downward, and the left aim portion is moved upward. At this point, the elastic member of the right positioning member 32 is compressed, and the left positioning member 32 disengages the arm portion 211. The first elastic member 321 and the second elastic member 322 of the right positioning member 32 are compressed, and the cap 326 and the spacer 325 are moved downward in axial directions thereof. The left positioning member 32 is regulated so as not to move upward any further in a manner where the shoulder portions 326a of the cap 326 of the left positioning member 32 engage the lower portion of the maintaining portion 312 at the upper surface of the shoulder portions 326a, and the upper portion of the spacer 325 contacts the lower portion of the second maintaining portion 313. After the shift lever 2 is pivoted in the select direction, because the elastic member of the right positioning member 32 being compressed as mentioned above is extended, the right arm portion 211 of the shift lever 2 is pressed upward by the right positioning member 32, so that the shift lever 2 is rotated relative to the pivot portion 21 in a manner where the right arm portion 211 is moved upward and the left arm portion 311 is moved downward. Then, the top portion 326b of the cap 326 being disengaged from the left arm portion 211 engages the lower portion of the left arm portion 211, as a result, the shift lever 2 is returned to the neutral position.

In this configuration, when the vibrations are transmitted from the manual transmission and the like to the shift lever apparatus 1, although the first elastic members 321 of the positioning members 23 vibrate, and the second elastic members 322 absorb the vibrations of the first elastic members 321. At this point, the spacers 325 also vibrate due to the vibrations of the first elastic members 321, however, when the shift lever 2 is located at the neutral position, because of the buffering space provided between the cap 326 and the spacer 325 of the each positioning member 23, even when the spacer 325 vibrates, because the spacer 325 does not contact the cap 326, the vibrations are not transmitted to the cap 326. In this configuration, because the second elastic member does not vibrate, and the vibrations of the spacer 325 are not transmitted to the cap 32, the vibrations from the manual transmission and the like are not transmitted to the shift lever 2, as a result, the shift lever 2 may not vibrate together with the manual transmission and the like.

According to the shift lever apparatus 1 of the second embodiment, the shift lever 2 is set to the neutral position in a manner where the shift lever 2 is maintained at the neutral position in a select direction by means of the first elastic member 321, whose spring constant is relatively large, the cap 326, the spacer 325, the maintaining portion 312 and the second maintaining portion 313. Further, because the second elastic member 322 whose spring constant is relatively small-absorbs the vibrations transmitted from the manual transmission and the like, and the vibrations of the first elastic member 322 are not transmitted from the spacer 325 to the cap 326 because of the buffering space, the shift lever 2 may not vibrate together with the manual transmission and the like.

Further, because of the second maintaining portion 313, the buffering space is certainly secured between the cap 326 and the spacer 325 accordingly, the vibrations are not transmitted from the spacer 325 to the cap 326, as a result, the shift lever 2 may not vibrate due to the vibrations from the transmission and the like.

The above embodiments may be modified within the scope of the invention. For example, each second elastic member may be provided below the first elastic member, instead of the above the first elastic member. Further, the maintaining portion and the second maintaining portion may not be provided at the base member. Furthermore, each of the first elastic member and the second elastic member may be provided so as to be in a line without the cap and the spacer.

Thus, the shift lever apparatus includes the shift lever that is biased by positioning members so as to be at the neutral position. Each positioning member includes two types of the elastic member, one elastic member has a spring constant that differs from a spring constant of the other elastic member. Because the elastic member (second elastic member) having a smaller spring constant has a low natural frequency, vibrations may not be transmitted from the transmission or the like to the shift lever. However, the elastic member (second elastic member) having the smaller spring constant generates a biasing force that moderately changes depending on the shift lever operation, as a result, the neutral position of the shift lever may be ambiguous. Accordingly, the compressed amount of the second elastic member is regulated to be a predetermined compressed amount that is a maximum level at which the vibrations from the transmission or the like are blocked, and large vibrations may be received by the first elastic member having a larger spring constant, the shift lever is appropriately set to the neutral position, as a result the driver may obtain comfortable operational feeling.

According to an aspect of the present invention, a total length of the first elastic member and the second elastic member when the shift lever is located at the neutral position is set to a predetermined total length, ad the base member includes a maintaining portion for maintaining a length obtained by adding a length of the first elastic member and a length of the second elastic member to be equal to or less then the predetermined total length.

Thus, the shift lever is biased by the first elastic member and the second elastic member so as not to exceed the neutral position, only the counteraction against the operation of the shift lever is applied to the shift lever when the driver operates the shift lever so as to be pivoted, the counteraction may be rapidly generated, as a result, the driver may feel more stable operational feeling. Specifically, because a natural length of the first elastic member and the second elastic member is set to be longer than the length thereof when the shift lever is maintained at the neutral position each of the first elastic member and the second elastic member is compressed when the shift lever is maintained at the neutral position, as a result, the shift lever is maintained more firmly.

According to an aspect of the present invention, the second elastic member compressed amount regulating member includes a spacer provided between the first elastic member and the second elastic member; and a compression regulating member including a first regulating portion at which one end of the second elastic member is fixed, and a second regulating portion for regulating the compression of the second elastic member in a manner where the other end of the second elastic member contacts the spacer when the second elastic member is compressed by the predetermined compressed amount so as to be the predetermined length.

According to an aspect of the present invention, the second elastic member compressing amount regulating member includes a spacer maintaining portion for maintaining the spacer so as not to move toward the second elastic member so that the second elastic member is not compressed so as to be less than a length obtained by adding a length of the second regulating portion to a length of the predetermined compressing amount, when the shift lever is set to the neutral position.

Thus, the shift lever is maintained at the neutral position by means of two elastic members (one elastic member has a larger spring constant, and the other elastic member has a smaller spring constant), and those elastic members are arranged so as to be in a line. In this configuration, because vibrations from the outside of the shift lever apparatus may be stopped by the second elastic member having the small spring constant, the shift lever may be maintained at the neutral position, as a result, vibrations can be prevented from being transmitted to the shift lever. Further, when the shift lever is maintained at the neutral position, the second elastic member is regulated so as to be equal to or less than the predetermined length by means of the second elastic member compressed amount regulating member, the shift lever may be firmly maintained at the neutral position by means of the first elastic member having the large spring constant.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims be embraced thereby.

The invention claimed is:

1. A shift lever apparatus comprising:
a shift lever including a pivot portion and a stick portion formed so as to extend in a vertical direction from the pivot portion;
a base member including
a shift lever supporting portion for supporting the pivot portion so that the shift lever is pivotable in a select direction and a shift direction and a positioning member for applying a biasing force to the shift lever so as to pivot in one direction and the other direction of the select direction so that the shift lever is balanced at a neutral position of the select direction; and
the positioning member including a first elastic member for pressing the shift lever in a manner where one portion of the positioning member contacts the shift lever and for compressing/extending in accordance with the pivotal movement of the shift lever in the select direction, a second elastic member whose spring constant is smaller than that of the first elastic member and provided so as to be in line with the first elastic member, and a second elastic member compressed amount regulating member for regulating the second elastic member to be compressed by a predetermined compressed amount so that a length of the second elastic member is a predetermined length.

2. The shift lever apparatus according to claim 1, wherein a total length of the first elastic member and the second elastic member when the shift lever is located at the neutral position is set to a predetermined total length, and the base member includes a maintaining portion for maintaining a length obtained by adding a length of the first elastic member and a length of the second elastic member to be equal to or less than the predetermined total length.

3. The shift lever apparatus according to claim 2, wherein the second elastic member compressed amount regulating member includes:
   a spacer provided between the first elastic member and the second elastic member; and a compression regulating member including a first regulating portion at which one end of the second elastic member is fixed, and
   a second regulating portion for regulating the compression of the second elastic member in a manner where the other end of the second elastic member contacts the spacer when the second elastic member is compressed by the predetermined compressed amount so as to be the predetermined length.

4. The shift lever apparatus according to claim 3, wherein the second elastic member compressing amount regulating member includes a spacer maintaining portion for maintaining the spacer so as not to move toward the second elastic member so that the second elastic member is not compressed so as to be less than the predetermined length of the second elastic member being compressed by the predetermined compressing amount, when the shift lever is set to the neutral position.

5. The shift lever apparatus according to claim 1, wherein the second elastic member compressed amount regulating member includes:
   a spacer provided between the first elastic member and the second elastic member; and a compression regulating member including a first regulating portion at which one end of the second elastic member is fixed, and
   a second regulating portion for regulating the compression of the second elastic member in a manner where the other end of the second elastic member contacts the spacer when the second elastic member is compressed by the predetermined compressed amount so as to be the predetermined length.

6. The shift lever apparatus according to claim 5, wherein the second elastic member compressing amount regulating member includes a spacer maintaining portion for maintaining the spacer so as not to move toward the second elastic member so that the second elastic member is not compressed so as to be less than the predetermined length of the second elastic member being compressed by the predetermined compressing amount, when the shift lever is set to the neutral position.

7. A shift lever apparatus comprising:
   a shift lever including a pivot portion, a connecting portion connectable to a transmission, and a stick portion, the stick portion extending in a vertical direction from the pivot portion; and
   a base member, the base member comprising:
      a shift lever supporting portion in which is received the pivot portion of the shift lever so that the shift lever is pivotally supported for pivoting movement in a select direction and a shift direction;
      a positioning member which applies a biasing force to the shift lever to pivot the shift lever in one direction and an other direction of the select direction so that the shift lever is balanced at a neutral position of the select direction;
      the positioning member including a first elastic member which presses a portion of the positioning member into contact with the shift lever and which compresses/extends during the pivoting movement of the shift lever in the select direction;
      the positioning member including a second elastic member aligned with the first elastic member and possessing a smaller spring constant than the spring constant of the first elastic member;
      the positioning member including a second elastic member compressed amount regulating member which regulates compression of the second elastic member so the second elastic member is compressed when the shift lever is biased to the neutral position, vibrations transmitted from the transmission to the shift lever apparatus and causing vibration of the first elastic member are absorbed by the compressed second elastic member which possesses the smaller spring constant to inhibit vibration of the shift lever.

8. The shift lever apparatus according to claim 7, wherein the second elastic member compressed amount regulating member includes: a spacer between the first elastic member and the second elastic member; and a compression regulating member,
   the compression regulating member including a first regulating portion at which one end of the second elastic member is fixed, and a second regulating portion for regulating the compression of the second elastic member in a manner where the other end of the second elastic member contacts the spacer.

9. The shift lever apparatus according to claim 7, wherein the second elastic member compressed amount regulating member includes a spacer between one end of the first elastic member and a facing end of the second elastic member, the second elastic member compressed amount regulating member also including a cap contacted by the second elastic member.

10. The shift lever apparatus according to claim 9, wherein the spacer is spaced apart from the cap when the shift lever is in the neutral position.

* * * * *